(12) United States Patent
Lendi

(10) Patent No.: US 11,936,965 B2
(45) Date of Patent: Mar. 19, 2024

(54) INSPECTION NOZZLE OR CLEANING NOZZLE WITH SWITCHABLE CAMERA MODULE

(71) Applicant: Enz Technik AG, Giswil (CH)

(72) Inventor: Christoph Lendi, Giswil (CH)

(73) Assignee: Enz Technik AG, Giswil (CH)

( * ) Notice: Subject to any disclaimer, the term of this patent is extended or adjusted under 35 U.S.C. 154(b) by 0 days.

(21) Appl. No.: 17/749,251

(22) Filed: May 20, 2022

(65) Prior Publication Data
US 2022/0377210 A1 Nov. 24, 2022

(30) Foreign Application Priority Data
May 21, 2021 (CH) ..................................... 00577/21

(51) Int. Cl.
*H04N 23/51* (2023.01)
*B08B 3/02* (2006.01)
*B08B 13/00* (2006.01)
*H04N 23/54* (2023.01)
*H04N 23/50* (2023.01)

(52) U.S. Cl.
CPC .............. *H04N 23/51* (2023.01); *B08B 3/02* (2013.01); *B08B 13/00* (2013.01); *H04N 23/54* (2023.01); *H04N 23/555* (2023.01)

(58) Field of Classification Search
CPC ...... H04N 23/51; H04N 23/54; H04N 23/555; B08B 3/02; B08B 13/00
USPC ......................................................... 348/143
See application file for complete search history.

(56) References Cited

U.S. PATENT DOCUMENTS

| | | | |
|---|---|---|---|
| 3,855,439 A * | 12/1974 | Hermann | H03K 17/97 310/DIG. 3 |
| 4,576,148 A * | 3/1986 | Koerner | A61H 1/0288 482/901 |
| 4,782,432 A * | 11/1988 | Coffman | F21V 23/0435 362/171 |
| 5,097,618 A * | 3/1992 | Stoffel | A01K 97/125 43/17.1 |

(Continued)

FOREIGN PATENT DOCUMENTS

| | | |
|---|---|---|
| CH | 707691 A2 | 9/2014 |
| DE | 29721528 U1 | 2/1998 |
| DE | 202011104073 U1 | 11/2011 |

*Primary Examiner* — Matthew David Kim
(74) *Attorney, Agent, or Firm* — Paul D. Bianco; Stephen Bongini; Fleit Intellectual Property Law

(57) ABSTRACT

Operational convenience is to be improved in an inspection nozzle or cleaning nozzle for operation with liquids under high pressure with a coupling section that can be connected to a high-pressure tube. A feed bore, a deflection chamber and at least one communicating bore are operatively connected to the coupling section. A camera recess running concentric to a longitudinal axis is arranged in a camera-receiving portion. A camera module is accommodated releasably connected to an encapsulated camera housing sealed water-tight. Optics and camera electronics are permanently incorporated in camera housing. Case manipulation of the camera module and the camera housing is unnecessary. This is realized in that within the camera housing, a contactless magnetically operable camera switch is arranged effectively connected to the camera electronics via a circuit board on one wall of the camera housing.

11 Claims, 2 Drawing Sheets

(56) References Cited

U.S. PATENT DOCUMENTS

| | | | | |
|---|---|---|---|---|
| 5,691,842 A | * | 11/1997 | Devenyi | G02B 23/14 |
| | | | | 359/422 |
| 7,920,163 B1 | * | 4/2011 | Kossin | H04N 23/51 |
| | | | | 396/25 |
| 2005/0151876 A1 | * | 7/2005 | Karr | H04N 23/51 |
| | | | | 348/E5.026 |
| 2006/0055526 A1 | * | 3/2006 | Long | G08B 21/22 |
| | | | | 340/502 |
| 2007/0219409 A1 | * | 9/2007 | Shimizu | A61B 1/045 |
| | | | | 600/101 |
| 2014/0073238 A1 | * | 3/2014 | Henn | H04B 7/145 |
| | | | | 455/7 |
| 2014/0247338 A1 | * | 9/2014 | Kessler | E03F 7/12 |
| | | | | 239/289 |
| 2016/0129486 A1 | * | 5/2016 | Bauer | H04N 23/54 |
| | | | | 134/167 C |
| 2017/0343888 A1 | * | 11/2017 | Raskin | G03B 15/02 |
| 2020/0179995 A1 | * | 6/2020 | Loades | E03F 9/002 |

\* cited by examiner

PRIOR ART

INSPECTION NOZZLE OR CLEANING NOZZLE WITH SWITCHABLE CAMERA MODULE

TECHNICAL FIELD

The present invention describes an inspection nozzle or cleaning nozzle for operation with liquids under high pressure with a coupling section that can be coupled to a high-pressure tube, wherein a feed bore, a deflection chamber and at least one communicating bore are operatively connected to the coupling section, wherein a camera recess running concentric to a longitudinal axis is arranged in a camera-receiving portion, wherein a camera module is accommodated releasably connected to a camera housing encapsulated water-tight, wherein optics and camera electronics are permanently incorporated in the camera housing.

BACKGROUND

Cleaning nozzles or inspection nozzles equipped with a camera or, more generally, an optical sensor are guided with a liquid under high pressure through pipes and conduits, where the interior walls and generally a cleaning effect conducted previously or simultaneously are checked. Employed liquid pressures of the supplied liquids lie in the range of 10 bar to a few hundred bar.

A high-pressure cleaning nozzle with a video camera is described in utility model DE202021104073. The cleaning nozzle has a plurality of multipurpose nozzles, which serve for cleaning and/or propulsion and/or to clean the camera.

A pipe-cleaning nozzle with a nozzle head in which a camera is integrated also disclosed in German utility model DE29721528. The purpose here is again to avoid a separate device for inspection of the pipe being cleaned and instead to couple the cleaning device and the inspection device. This pipe-cleaning nozzle has a camera and an illumination means in the nozzle head, in which case wiring to supply electrical power is described. A central receptacle in a multipart nozzle head is shown in the figure, in which the camera is positioned. Since a cleaning nozzle rotatable about the longitudinal axis is assumed, a slip ring contact arrangement is positioned to convey a camera supply line from the outside of the cleaning nozzle to the camera.

FIG. 1A shows the inspection nozzle 0 known from CH707691, which consists of a coupling unit 1 and a camera-receiving portion 2 with a camera recess 20. The coupling unit 1 extends in the longitudinal direction L to the camera-receiving portion 2 from coupling unit 1 with a coupling section 10, via a feed bore 11 and a deflection chamber 12, which discharges into bores 13. The matching camera recess 20 to accommodate a camera module 3 is arranged in the camera-receiving portion 2 so that the camera module 3 can be fastened by fastening devices 22 in fastening device recesses 21 provided for this purpose.

The camera module 3 has a housing and camera optics, camera electronics, generally wiring and, more recently, also rechargeable batteries situated therein. The overall inspection nozzle 0 includes components that are releasably connected one to another, and the camera module 3 is also secured releasably in the camera-receiving portion 2. The sensitive camera electronics, the camera optics and possibly the battery must be protected from environmental effects, for which a water-tight encapsulation is required. No cleaning liquid should be able to penetrate into the camera module 3 or the camera housing 30. Servicing of the camera, which should not be continuously connected so as not to reduce the service life of the battery, is therefore a problem. Even if the problem of maintenance of the camera were now to be solved, one would like to dispense with frequent installation and removal of the camera and to manipulate or interfere with the encapsulation as little as possible.

SUMMARY OF THE INVENTION

The drawbacks known from the prior art and described above are to be addressed by the device according to the invention.

One aspect of the present invention relates to an inspection nozzle for operation with liquids under high pressure whose operational convenience is improved. The camera can be operated from the outside without manipulation of the camera module or the camera housing.

Variations of feature combinations and respective slight adjustments of the invention can be found in the detailed description, depicted in the figures and included in the claims.

BRIEF DESCRIPTION OF THE DRAWINGS

The invention is described in detail below in conjunction with the appended drawings. Features, details and advantages of the invention are apparent from the subsequent description, in which a preferred embodiment of the invention and some additional features or optional features are also listed in detail.

FIG. 1A shows a perspective view of an inspection nozzle known from the prior art, whereas

DESCRIPTION

Figure 1A:
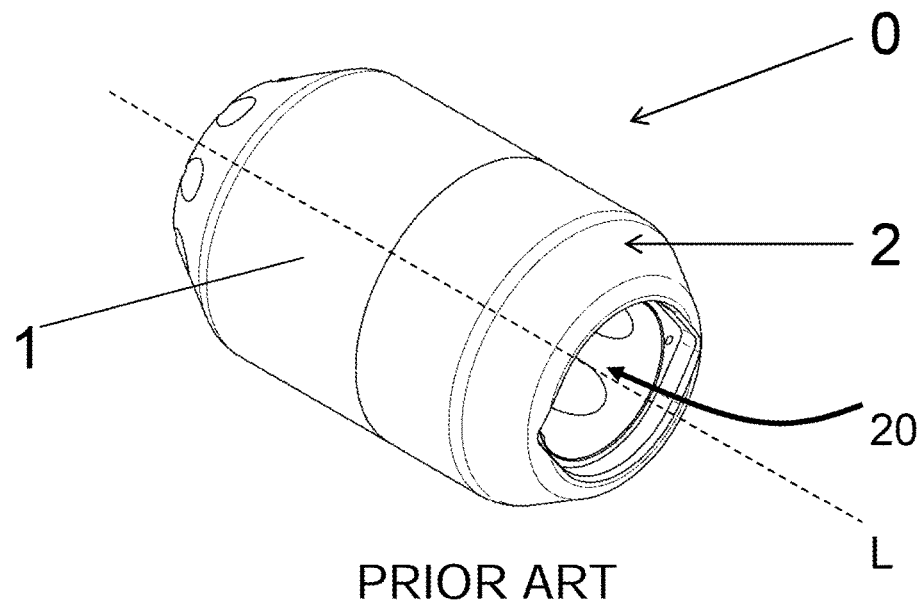

An inspection nozzle or cleaning nozzle 0 with a camera nozzle 3 is depicted as an example, which here shows parts separable from each other, a coupling unit 1 and a camera-receiving portion 2. Both parts 1, 2 are made as robustly as possible from metal and can be releasably connected to each other. The coupling unit 1 includes a feed bore 11 in a coupling section 10. During operation, liquid under high pressure, at least 10 bar, but generally much more, is introduced through feed bore 11 by means of a high-pressure tube (not shown) fastened to coupling section 10. The coupling unit 1 also has a deflection chamber 12, into which the feed bore 11 discharges, and at least one bore 13 directed backward, which is equipped with a nozzle insert 130. Fastening of the high-pressure tube to coupling section 10 and to the feed bore are not taken up in greater detail here, as these are known to a person skilled in the art. The high-pressure tube carries a cleaning agent, for example, wastewater or fresh water, in the cleaning insert under high pressure of a few bar to a few hundred bar, which after deflection in deflection chamber 12 emerges from the at least one bore 13 and the at least one nozzle insert 130. The bores 13 are arranged oriented backwards, i.e., in the direction of the high-pressure tube. The overall inspection nozzle 0, accordingly, can be moved when acted upon by pressure in the feed direction indicated with the arrow. A cleaning effect of the surrounding pipe or duct walls can be achieved, in addition to propulsion, through the liquid emerging from bore 13 and the at least one nozzle insert 130. Several bores 13 and differently oriented bores 13 can, of course, lead to an improved cleaning effect, which is adjustable as desired.

Figure 1B:
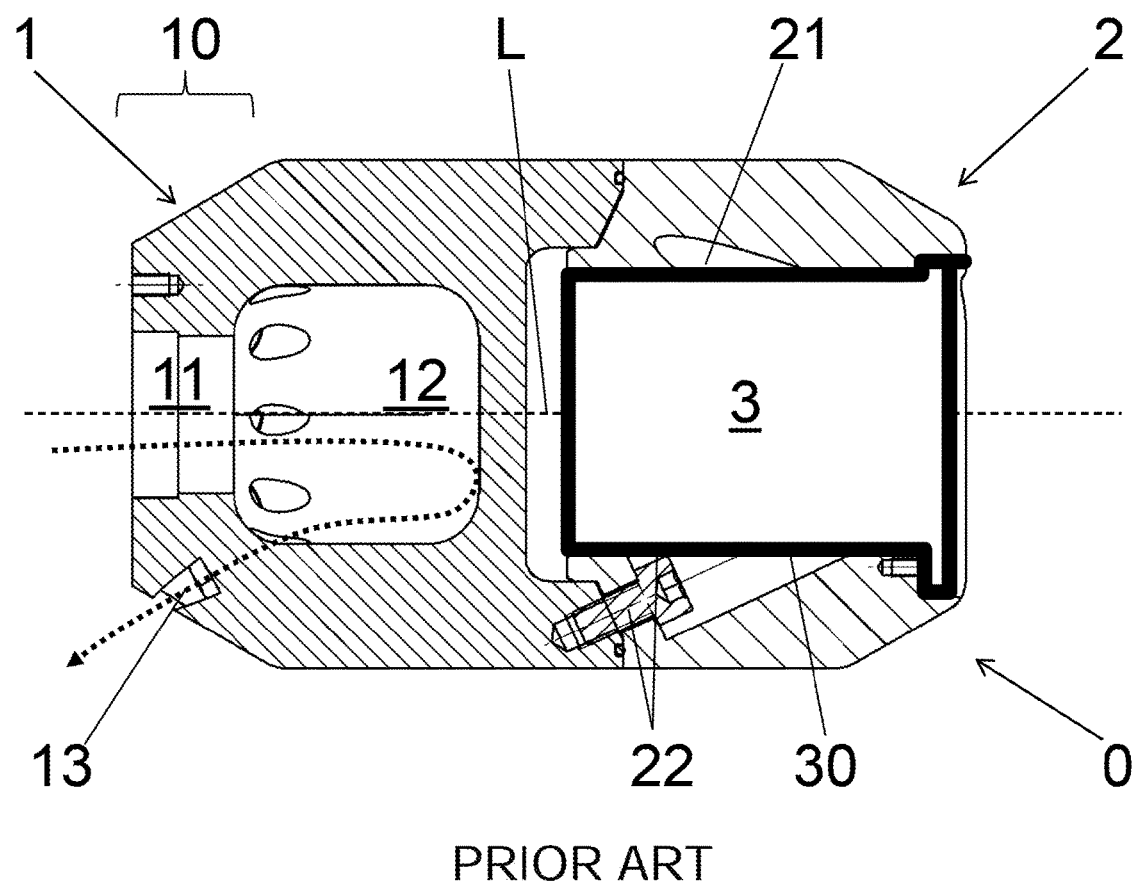
FIG. 1B shows a longitudinal section through the inspection nozzle according to FIG. 1A known from the prior art along the longitudinal axis.

The camera-receiving portion 2 separable from the coupling unit 1 has a camera recess 20, which is accommodated in the camera-receiving portion 2 concentric to the longitudinal axis L. An empty space is optionally left between coupling unit 1 and the camera-receiving portion 2. The camera recess 20 is adjusted to a camera module 3 and its outer camera housing 30, so that the camera housing 30 fills the camera recess 20. As indicated in FIGS. 1A and 1B, fastening device recesses 21 (not shown in FIG. 2) are provided, which are provided with fastening devices 22 for fixation of the camera module 3 and the camera housing 30. When coupling unit 1 and camera-receiving portion 2 are made separately, these parts 1, 2, like camera module 3, are configured to be releasably connected form-fit and/or force-fit in the camera-receiving portion 2 for assembly and maintenance purposes. The camera housing 30 is, of course, introduced on the side of the camera-receiving portion 2 separated from the feed bore 11 and releasably fastened there.

The camera module 3 has optics 31 and camera electronics 32 in addition to the camera housing 30. Light is collected by optics 31 and guided to an image sensor as part of camera electronics 32.

The components of the camera electronics 32 are arranged on at least one circuit board, wherein a person skilled in the art is familiar with ordinary semiconductor-based image sensors for light up to the mid-infrared region. Illumination devices are ordinarily provided, which permit recording of a camera image in underground conduits and pipes and are defined here as part of the camera electronics 32 but are not additionally shown.

The camera electronics 32 has all the necessary components so that images and videos can be recorded, stored and/or transmitted after installation of the camera module 3 into the inspection nozzle or cleaning nozzle 0, in which case the encapsulated, water- and air-tight camera housing 30 can remain in the inspection or cleaning nozzle 0.

In order to protect the camera electronics 32 and all components within the camera housing 30 from environmental effects, i.e., especially the liquid supplied under high pressure, but also from mechanical effects, the wall of the camera-receiving portion 2 and the camera housing 30 itself must be as robust as possible. In the best case, the camera recess 20 is designed only slightly larger than the outside dimension of the camera housing 30 so that a force-fit of the camera module 3 in the camera recess 20 is achieved. This naturally hinders removal of the camera module 3; however, currently, this is no longer necessary. There has been a transition to designing the power supply of the camera module 3 with a built-in battery 320 as part of the camera electronics 32. The camera housing 30 after installation of all the camera electronic components can then be sealed water-tight and encapsulated. Supply and connection of cables from the outside via plugs and sockets can be dispensed with. While the battery can be charged in contactless fashion via inductive or generally electromagnetic methods from the outside of the inspection nozzle 0, all components during operation remain protected at all times even under the influence of high pressure.

In order to be able to operate the camera electronics 32 from the outside of the inspection nozzle 0 or the cleaning nozzle with camera module 0 without weakening the camera-receiving portion 2, a contactless camera switch 322 and a circuit board 321 are incorporated in the encapsulated camera housing 30 as part of the camera electronics 32.

The camera switch 322 can be operated in contactless fashion magnetically, i.e., by the action of a magnetic field from the outside, in which case a permanent magnet or electromagnet 4 is used. The camera switch 322 is designed as a magnetic sensor 322, which during activation, i.e., the action of an external magnetic field, triggers a switching process via the circuit board 321 in the camera electronics 32. The magnetic vortex field is represented here by dashed circles.

The camera electronics 32 can therefore be activated from the outside of the camera housing 30, camera-receiving portion 2 and inspection nozzle 0.

The position of the camera switch 322 should be on the side of the camera-receiving portion 2 facing away from coupling unit 1, on the side of the camera-receiving portion 2 facing the output of the camera recess 20. Relative to camera housing 30, the camera switch 322 should be separated from the camera electronics 32, arranged on the edge of the camera housing 30 on its inside surface.

Figure 2:
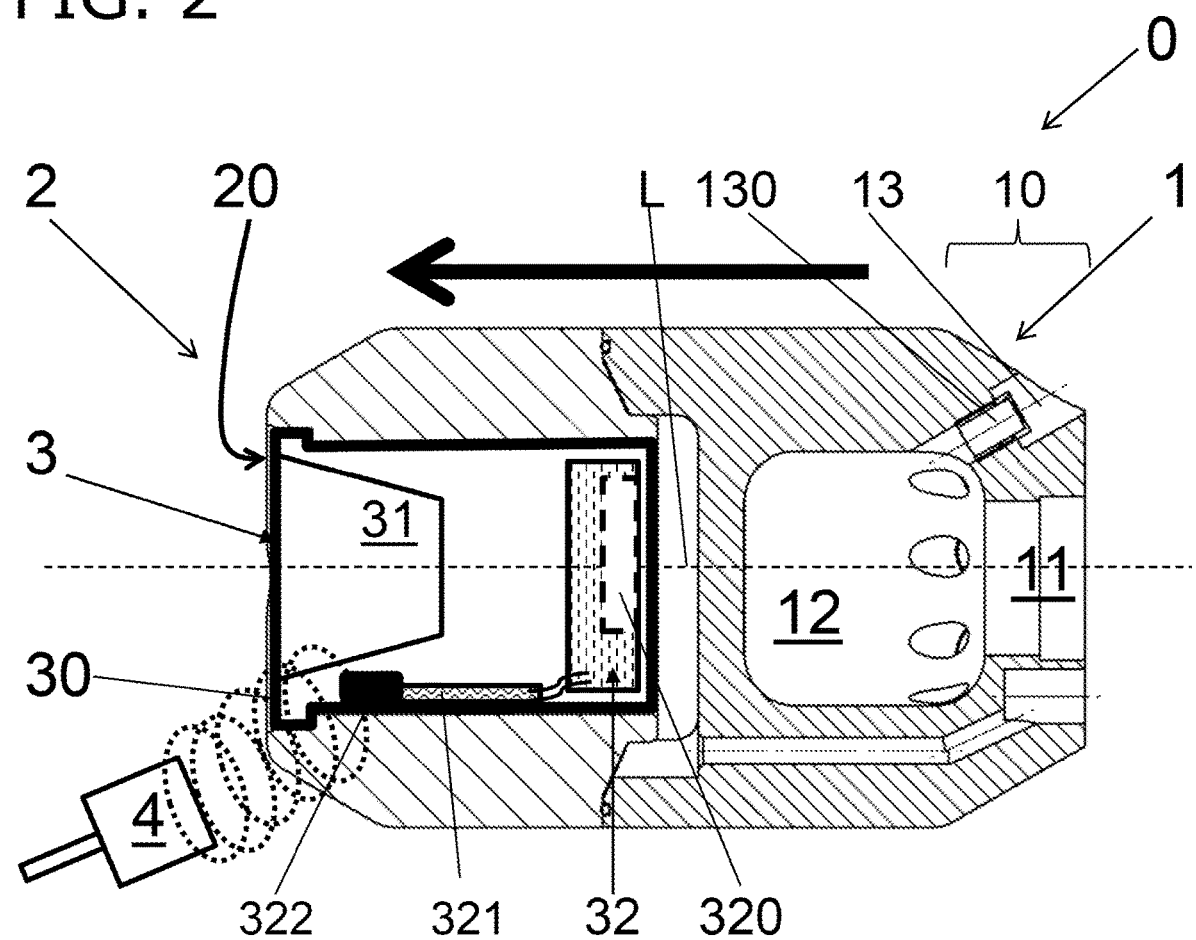
FIG. 2 shows a longitudinal section through an inspection nozzle with an adapted camera module.

Whereas FIG. 2 shows an arrangement on an inside surface of the peripheral side wall of the encapsulated camera housing 30 at the level of optics 31, an arrangement on the front face of the camera housing 30 opposite camera electronics 32 would also be advantageous.

Reed switches, reed sensors, reed relays or change-over reed contacts are used as simple magnetically operable camera switches 322. When such magnetically operable camera switches 322 are used, appropriate non-magnetic material must be used for the camera housing 30 and camera-receiving portion 2, and the spacings between the walls and magnetic camera switch 322 must be taken into consideration so that disturbances of the magnetic camera switch 322 do not occur.

A contactless magnetically operable camera switch 322 could also be designed as a Hall sensor, with which more complicated signals could be transmitted to the camera electronics 32, in which case external magnetic fields of different strengths can be used by means of different permanent magnets or coils through which current is passed. Field plates, sensors based on semiconductors utilizing a magnetoresistive effect can also be used as camera switch 322 with adaptive circuit board 321 and contacting to the camera electronics 32.

One or more forward directed purge bores or purge nozzles can optionally be introduced into the camera-receiving portion 2. Fluid feed channels would be made accordingly in the deflection chamber 12 in coupling unit 1, which discharge into the purge bores so that cleaning agent can emerge from the deflection chamber 12 forward from the camera recess 20 at a spacing via the fluid feed channels from the purge bores.

The design of a backward slope on the coupling unit 1 and a slope on the camera-receiving portion 2 on the camera side facilitate movement of the inspection nozzle 0 in both directions within a pipe during operation, since interfering edges are avoided as obstacles.

LIST OF REFERENCE NUMBERS

0 Inspection nozzle or cleaning nozzle with camera module
1 Coupling unit
10 Coupling section
Coupling device recess
11 Feed bore
Inside thread
12 Deflection chamber 13 Bore
130 Nozzle insert
2 Camera-receiving portion
20 Camera recess
21 Fastening device recess
22 Fastening device
L Longitudinal direction
3 Camera module
30 Camera housing
31 Optics
32 Camera electronics
320 Battery
321 Circuit board
322 Camera switch (magnetic field sensor, for example, reed switch, Hall probe)
4 Permanent magnet or electromagnet

The invention claimed is:

1. An inspection nozzle or cleaning nozzle for operation with liquids under high pressure, the inspection nozzle or cleaning nozzle comprising:
   a coupling section that can be connected to a high pressure tube;
   a feed bore, a deflection chamber, and at least one communicating bore that are operatively connected to the coupling section;
   a camera-receiving portion having a camera recess running concentrically to a longitudinal axis;
   a camera module releasably connected to in the camera recess of the camera-receiving portion, the camera module including an encapsulated camera housing that is sealed water-tight, with optics and camera electronics being permanently incorporated in the encapsulated camera housing; and
   a magnetically operable contactless camera switch within the encapsulated camera housing, the contactless magnetically operable camera switch being attached to one wall of the encapsulated camera housing in operative connection with the camera electronics via a circuit board,
   wherein the camera electronics can be activated in a contactless manner from outside of the encapsulated camera housing via the contactless magnetically operable camera switch without manipulation of the camera module or encapsulated camera housing, and
   no power supply line from outside of the inspection nozzle or cleaning nozzle can be connected to the camera module.

2. The inspection nozzle or cleaning nozzle according to claim 1, wherein the contactless magnetically operable camera switch is arranged on a side of the camera electronics opposite the camera electronics at a spacing on the inside surface of the camera housing.

3. The inspection nozzle or cleaning nozzle according to claim 2, wherein the contactless magnetically operable camera switch is mounted on an inside surface of the peripheral side wall of the encapsulated camera housing at the level of the optics in the direction of the longitudinal axis.

4. The inspection nozzle or cleaning nozzle according to claim 2, wherein the contactless magnetically operable camera switch is mounted on the front surface of the camera housing opposite the camera electronics.

5. The inspection nozzle or cleaning nozzle according to claim 2, wherein the magnetically operable camera switch is realized as a reed switch, reed sensor, reed relay or change-over reed contact.

6. The inspection nozzle or cleaning nozzle according to claim 1, wherein the magnetically operable camera switch is realized as a reed switch, reed sensor, reed relay or change-over reed contact.

7. The inspection nozzle or cleaning nozzle according to claim 1, wherein the magnetically operable camera switch is realized as a Hall sensor.

8. An inspection nozzle or cleaning nozzle for operation with liquids under high pressure, the inspection nozzle or cleaning nozzle comprising:
   a coupling section that can be connected to a high pressure tube;
   a feed bore, a deflection chamber, and at least one communicating bore that are operatively connected to the coupling section;
   a camera-receiving portion having a camera recess running concentrically to a longitudinal axis;
   a camera module releasably connected in the camera recess of the camera-receiving portion, the camera module including an encapsulated camera housing that is sealed water-tight;
   optics and camera electronics permanently incorporated within the encapsulated camera housing, the camera electronics including at least one battery; and
   a contactless camera switch within the encapsulated camera housing, the contactless camera switch being in operative connection with the camera electronics,
   wherein the camera electronics can be activated in a contactless manner from outside of the encapsulated camera housing via the contactless camera switch without manipulation of the camera module or encapsulated camera housing, and
   no power supply line from outside of the inspection nozzle or cleaning nozzle can be connected to the camera module.

9. The inspection nozzle or cleaning nozzle according to claim 8, wherein the contactless camera switch comprises a magnetic field sensor.

10. The inspection nozzle or cleaning nozzle according to claim 8, wherein the contactless camera switch comprises a reed switch, reed sensor, reed relay or change-over reed contact.

11. The inspection nozzle or cleaning nozzle according to claim 8, wherein the contactless camera switch comprises a Hall sensor.

* * * * *